US010620291B1

(12) United States Patent
Taylor, Jr. et al.

(10) Patent No.: US 10,620,291 B1
(45) Date of Patent: *Apr. 14, 2020

(54) METHODS AND SYSTEMS FOR PERFORMING PHYSICAL MEASUREMENTS USING RADIO FREQUENCY (RF) SIGNALS

(71) Applicant: Setter Research, Inc., Greensboro, NC (US)

(72) Inventors: David W. A. Taylor, Jr., Greensboro, NC (US); W. Todd Faulkner, Sylva, NC (US); Edward J. Kreinar, Springfield, VA (US)

(73) Assignee: Setter Research, Inc., Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/527,087

(22) Filed: Jul. 31, 2019

Related U.S. Application Data

(63) Continuation of application No. 15/900,821, filed on Feb. 21, 2018, now Pat. No. 10,371,782.

(60) Provisional application No. 62/468,414, filed on Mar. 8, 2017.

(51) Int. Cl.
*G06K 7/10* (2006.01)
*G01S 1/04* (2006.01)
*H04B 1/69* (2011.01)

(52) U.S. Cl.
CPC ............. *G01S 1/045* (2013.01); *G01S 1/042* (2013.01); *H04B 1/69* (2013.01)

(58) Field of Classification Search
None
See application file for complete search history.

(56) References Cited

U.S. PATENT DOCUMENTS

| | | | |
|---|---|---|---|
| 6,859,761 B2 * | 2/2005 | Bensky | G01S 13/84 702/189 |
| 6,959,761 B2 | 11/2005 | Berchenko et al. | |
| 6,961,541 B2 * | 11/2005 | Overy | H04L 63/0492 455/41.2 |

(Continued)

OTHER PUBLICATIONS

USPTO, Non-Final Rejection in U.S. Appl. No. 15/900,821 dated Nov. 30, 2018.

(Continued)

*Primary Examiner* — Tuan A Tran
(74) *Attorney, Agent, or Firm* — NK Patent Law (57) ABSTRACT

The subject matter described herein includes methods and systems for performing physical measurements using radio frequency (RF) signals. According to one embodiment of the present invention, a method is disclosed for determining the distance between a first radio device and a second radio device. The method includes transmitting a radio frequency (RF) signal from the first radio device and receiving the RF signal by the second radio device. The method further includes a determining a carrier frequency of the RF signal and determining a slope of a carrier phase versus the carrier frequency corresponding to a rate of change of the carrier phase with the carrier frequency. The method also includes determining a physical distance between the first radio device and the second radio device based on the slope; wherein the physical distance is proportional to the slope plus an integer ambiguity term and a bias term.

20 Claims, 5 Drawing Sheets

(56) References Cited

U.S. PATENT DOCUMENTS

| | | | | |
|---|---|---|---|---|
| 7,139,581 B2* | 11/2006 | Berliner | .................. | G01S 13/82 |
| | | | | 455/456.1 |
| 7,170,412 B2* | 1/2007 | Knox | ........................ | G01S 3/32 |
| | | | | 340/572.1 |
| 7,574,732 B2* | 8/2009 | Knox | .................. | H04L 63/0492 |
| | | | | 340/572.1 |
| 8,159,367 B2* | 4/2012 | Hofer | ........................ | G01S 3/46 |
| | | | | 340/10.1 |
| 8,248,210 B2* | 8/2012 | Nikitin | .................. | G01S 5/0247 |
| | | | | 340/10.1 |
| 8,253,539 B2* | 8/2012 | Scaramozzino | .......... | G01S 5/02 |
| | | | | 340/10.2 |
| 9,271,258 B2* | 2/2016 | Taylor, Jr. | ................ | G01S 11/08 |
| 9,441,939 B2* | 9/2016 | Frederick | .................. | G01B 7/14 |
| 9,612,325 B2* | 4/2017 | Taylor, Jr. | ................ | G01S 13/84 |
| 9,829,574 B2* | 11/2017 | Taylor, Jr. | ................ | G01S 11/08 |
| 9,958,526 B2* | 5/2018 | Kumar | ........................ | G01S 3/46 |
| 2008/0143584 A1* | 6/2008 | Shoarinejad | .......... | G01S 13/751 |
| | | | | 342/127 |
| 2016/0104013 A1* | 4/2016 | Fessler | .................. | G01R 25/00 |
| | | | | 340/10.1 |

OTHER PUBLICATIONS

USPTO, Notice of Allowance in U.S. Appl. No. 15/900,821 dated May 20, 2019.

* cited by examiner

METHODS AND SYSTEMS FOR PERFORMING PHYSICAL MEASUREMENTS USING RADIO FREQUENCY (RF) SIGNALS

PRIORITY CLAIM

This application is a continuation of U.S. patent application Ser. No. 15/900,821 filed Feb. 21, 2018, entitled "METHODS AND SYSTEMS FOR PERFORMING PHYSICAL MEASUREMENTS USING RADIO FREQUENCY (RF) SIGNALS", which claims priority to U.S. Provisional Patent Application Ser. No. 62/468,414 filed Mar. 8, 2017. The disclosure of each of the aforementioned applications is incorporated herein by reference in their entireties.

TECHNICAL FIELD

The present invention relates to methods and devices that provide physical measurements of distance, speed, transfer time, and/or transfer frequency information that have many applications including navigation, land surveying, digital communications, and others, and more specifically, to making physical measurements using radio-frequency (RF) signals.

BACKGROUND

One method of measuring the range between two wireless devices includes using radio frequency (RF) received signal strength (RSS) measurements. Another method includes time-of-flight (TOF) ranging that measures the RF signal TOF between two wireless devices. Because RF signals travel at the speed of light, however, one-meter accuracy requires approximately 3 nanosecond (ns) time resolution. On a low-cost, low-power system, it may be difficult to achieve this accuracy. Typical radios may only resolve the time of events at the rate of their reference clock, resulting in resolution on the order of 50 ns (15 m). As a result, special techniques and hardware may need to be employed to enable desired accuracy.

Accordingly, a need exists for devices and methods that provide more accurate and configurable physical measurements, such as distance, speed, etc., using RF devices.

SUMMARY

According to one embodiment of the present invention, a method is disclosed for determining the distance between a first radio device and a second radio device. The method includes transmitting a radio frequency (RF) signal from the first radio device and receiving the RF signal by the second radio device. The method further includes a determining a carrier frequency of the RF signal and determining a slope of a carrier phase versus the carrier frequency corresponding to a rate of change of the carrier phase with the carrier frequency. The method also includes determining a physical distance between the first radio device and the second radio device based on the slope; wherein the physical distance is proportional to the slope plus an integer ambiguity term and a bias term.

In some embodiments, the method may further include transforming, using a Fourier transform, a spread-spectrum waveform into a frequency domain to generate a transformed frequency domain spread-spectrum waveform; and determining a rate of change of the carrier phase versus the carrier frequency based on the transformed frequency domain spread-spectrum waveform. Determining the slope may also include receiving individual frequency elements and determining the slope over sequential measurements and/or overlapping measurements.

In some embodiments, the method may further include determining segments of frequency elements using multiple spread-spectrum transmissions having separated carrier frequencies; and determining a wide-band phase-to-frequency relationship from the multiple spread-spectrum transmissions. In certain embodiments, the method may further include determining a plurality of wide-band phases from zero-frequency intercepts of multiple spread-spectrum transmissions having separated carrier frequencies; and determining a wide-band phase-to-frequency relationship from the plurality of wide-band phases.

In some embodiments, the method may further include determining a round trip phase slope value by combining a phase versus frequency slope measurement from the first radio device to the second radio device with a phase versus frequency slope measurement from the second radio device to the first radio device.

In some embodiments, the method may further include determining a round trip measurement for the RF signal transmitted between the first radio device and the second radio device; and measuring, using a third radio device, a time difference of arrival of the RF signal between the first radio device and the second radio device.

In some embodiments, the method may further include determining the carrier phase and the carrier frequency of the RF signal and determining a zero-frequency intercept of the slope. The method may further include measuring a relative carrier frequency.

In some embodiments, the RF signal may include a spread-spectrum Hermitian waveform. The spread-spectrum Hermitian waveform may include a Hermitian chirp waveform using circular-shift keying (CSK) data modulation on the Hermitian chirp waveform that includes circularly shifting transmitted baseband symbol samples to represent digital data.

A corresponding system suitable for implementing the above method includes a first radio device, a second radio device, and a measurement. The first radio device is configured to transmit an RF signal which is received by the second radio device. The measurement device is configured to determine a carrier frequency (and a phase of the carrier frequency) of the RF signal at the second radio device. The measurement device is further configured to determine a slope of the phase versus the frequency corresponding to a rate of change of carrier phase with frequency and using the slope to determine a physical distance between the first and the second radio device, where the distance is proportional to the slope plus an integer ambiguity term and a bias term. The measurement device may or may not be co-located or integrated with either the first radio device and/or the second radio device.

According to another embodiment of the present invention, a method is disclosed for determining a distance between a first radio device and a second radio device. The method includes transmitting a first RF signal from the first radio device and receiving the first RF signal by the second radio device. The method further includes transmitting a second RF signal from the second radio device and receiving the second RF signal by the first radio device. The method also includes a determining a first carrier frequency of the first RF signal and determining a first slope of a first carrier phase versus the first carrier frequency corresponding to a first rate of change of the first carrier phase with the first carrier frequency. The method further includes a determining a second carrier frequency of the second RF signal and determining a second slope of a second carrier phase versus the second carrier frequency corresponding to a second rate of change of the second carrier phase with the second carrier frequency. Finally, the method includes determining a round trip physical distance between the first and second radio devices, wherein the round trip physical distance is proportional to the round trip phase slope value.

According to another embodiment of the present invention, a system is disclosed for determining a distance between a first radio device and a second radio device. The system includes the first radio device, the second radio device, and a measurement system. The first radio device is configured for transmitting a first RF signal and the second radio device is configured for receiving the first RF signal. The second radio device is configured for transmitting a second RF signal and the first radio device is configured for receiving the second RF signal. The measurement system is configured for determining a first carrier frequency of the first RF signal, and determining a first slope of a first carrier phase versus the first carrier frequency corresponding to a first rate of change of the first carrier phase with first the carrier frequency. The measurement system is further configured for determining a second carrier frequency of the second RF signal, and determining a second slope of a second carrier phase versus the second carrier frequency corresponding to a second rate of change of the second carrier phase with the second carrier frequency. The measurement system is also configured for determining a round trip phase slope value by combining the first slope and the second slope; and determining a round trip physical distance between the first and second radio devices, wherein the round trip physical distance is proportional to the round trip phase slope value.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings. In the drawings.

DETAILED DESCRIPTION

The following description and figures are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

The subject matter disclosed herein includes methods and systems for using radio devices to perform physical measurements using radio frequency (RF) signals.

As will be described in greater detail below with respect to the figures, the subject matter described herein provides a new method for making physical measurements between radios based on measuring the rate of change of signal phase versus frequency. Systems may include at least two radio devices, at least one transmitter and at least one receiver, where a first radio transmits a signal and a second radio receives that signal. Using measured values as well as various known quantities, such as the RF propagation speed, carrier frequency, fractional wavelength, and the current time of day, the distance between the two radios can be determined.

Figure 1:
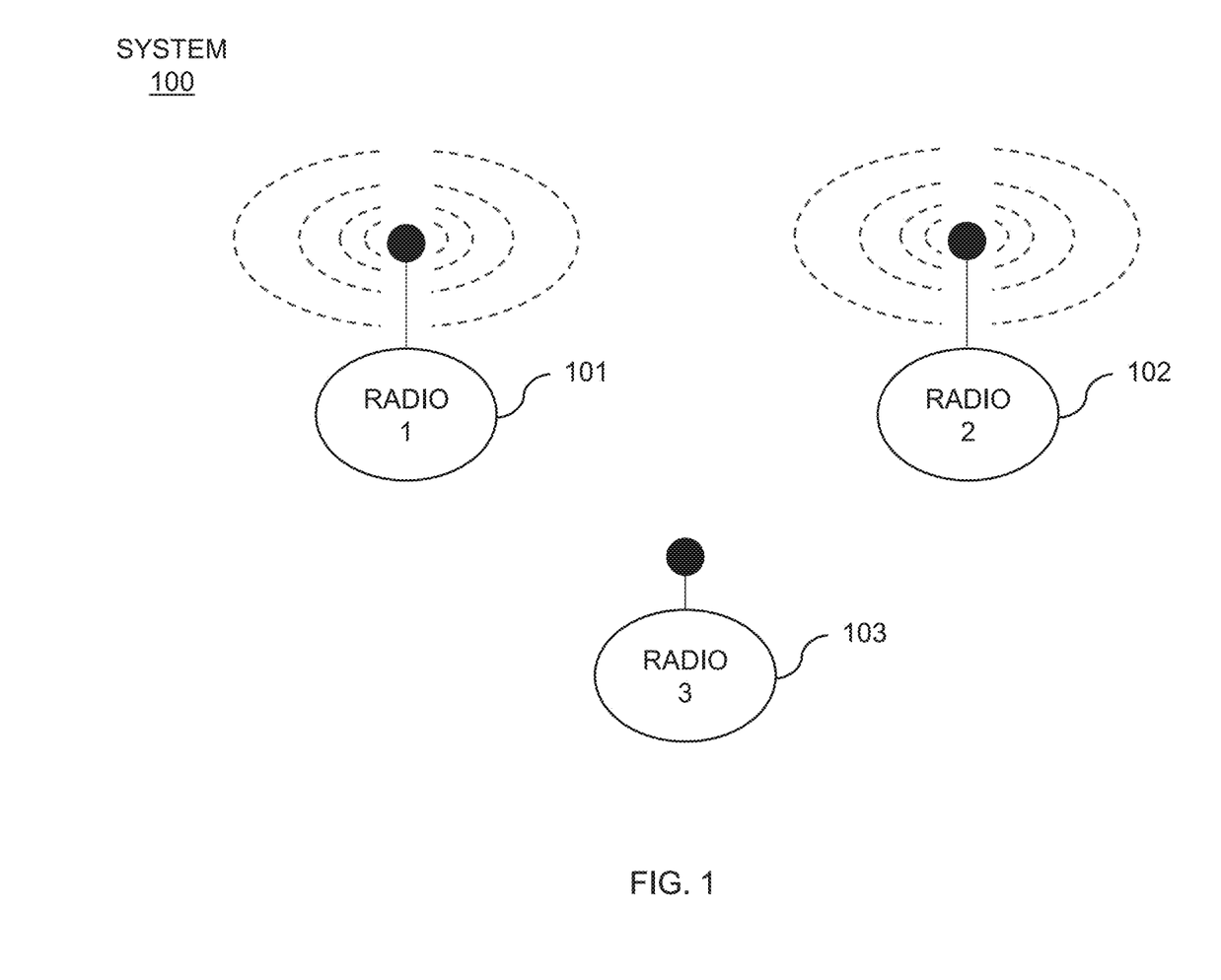
FIG. 1 depicts a system diagram illustrating an exemplary system of radio devices suitable for performing physical measurements using radio frequency (RF) signals according to an embodiment of the subject matter described herein.

FIG. 1 depicts a system 100 diagram illustrating an exemplary system of radio devices suitable for performing physical measurements using RF according to an embodiment of the subject matter described herein. Referring to FIG. 1, radio device 101 transmits a signal that is received by radio devices 102 and 103. Radio device 102 responds by transmitting a signal that is received by radio device 101 and radio device 103. The transmissions can be sequential, as in a half-duplex communication scheme, or concurrent, as in a full-duplex measuring scheme. Thus, the exemplary implementations using half-duplex communications could also be implemented using full-duplex communications.

Referring to FIG. 1, for example, consider two radios, radio device 101 and radio device 102, where the first radio device 101 transmits a signal and a second radio device 102 receives that signal. The distance between the two radios, x, can be expressed as the sum of an integer number of carrier wavelengths, N, plus a fractional wavelength, $\varepsilon$ as shown in Equation [1].

$$x = \frac{c}{f}(N + \varepsilon) \quad [1]$$

Where c is the radio frequency propagation speed, which is approximately the speed of light, and f is the carrier frequency. The fractional wavelength, $\varepsilon$, is the phase of the carrier frequency at the receiving radio, expressed as a fractional wavelength. Rearranging Equation [1] to solve for E, then taking the partial derivative with respect to frequency is represented according to Equation [2].

$$\frac{\partial \varepsilon}{\partial f} = x\frac{1}{c} - \frac{\partial N}{\partial f} \quad [2]$$

Rearranging again to solve for x, is represented according to Equation [3].

$$x = c\frac{\partial \varepsilon}{\partial f} + c\frac{\partial N}{\partial f} \quad [3]$$

Hence, distance is proportional to the rate of change of carrier phase with frequency, plus an integer ambiguity term.

Similarly, the time of flight, TOF, of the signal between the two radios can be found by dividing Equation [3] by the propagation speed, as shown in Equation [4].

$$TOF = \frac{\partial \varepsilon}{\partial f} + \frac{\partial N}{\partial f} \quad [4]$$

By encoding the current time of day in the communications data packet, and measuring the time of flight between radios, then time transfer to a second radio is accomplished.

The relative speed between the two radios can be found by taking the time rate of change of distance in Equation [1], as shown in Equation [5].

$$Speed = \frac{c}{f}\frac{\partial \varepsilon}{\partial t} + \frac{c}{f}\frac{\partial N}{\partial t} \quad [5]$$

Alternatively, the relative speed between the two radios can be found by taking the time rate of change of distance in Equation [3], as shown in Equation [6].

$$Speed = c\frac{\partial\left(\frac{\partial \varepsilon}{\partial f}\right)}{\partial t} + c\frac{\partial\left(\frac{\partial N}{\partial f}\right)}{\partial t} \quad [6]$$

Equations [1]-[6] provide a method for making physical measurements between radios based on the rate of change of signal phase versus frequency.

According to the half-duplex embodiment shown in FIG. 1, when radio device 101 transmits the signal, radio device 101 records the value of a local free-running baseband clock counter, $M_{101}^{tx}$. At radio device 102, upon receiving the signal transmitted by radio device 101, radio device 102 records the value of a local free-running baseband clock counter, $M_{102}^{rx}$. When radio device 102 transmits a reply to radio device 101, in the data payload radio device 102 reports $M_{102}^{rx}$ and the value of the free-running baseband clock counter at transmit time, $M_{102}^{tx}$. When radio device 101 receives the reply signal from radio device 102, it records its baseband clock counter, $M_{101}^{rx}$. Computed within radio device 101, the coarse time of flight between radio device 101 and radio device 102 is given by Equation $$TOF_{coarse} = \left(\frac{M_{101}^{rx} - M_{101}^{tx}}{f_{101}} - \frac{M_{102}^{tx} - M_{102}^{rx}}{f_{102}}\right)/2 \quad [7]$$

Where $f_{101}$ and $f_{102}$ are the baseband clock frequencies of radio device 101 and radio device 102, respectively, and $TOF_{coarse}$ is the coarse time of flight. If the baseband clock frequency was 40 MHz, for example, $TOF_{coarse}$ would have a precision limit of 25 nanoseconds, which corresponds to 7.5 meters' distance at a propagation speed of $3 \times 10^8$ meters/second. The elapsed baseband counters on radio device 101 and radio device 102 will be referred according to Equations [8] and [9] respectively. Quantities $M_{101}$ and $M_{102}$ may alternately be measured directly at radio devices 101 and 102.

$$M_{101} = M_{101}^{rx} = M_{101}^{tx} \quad [8]$$

$$M_{102} = M_{102}^{tx} - M_{102}^{rx} \quad [9]$$

Figure 2:
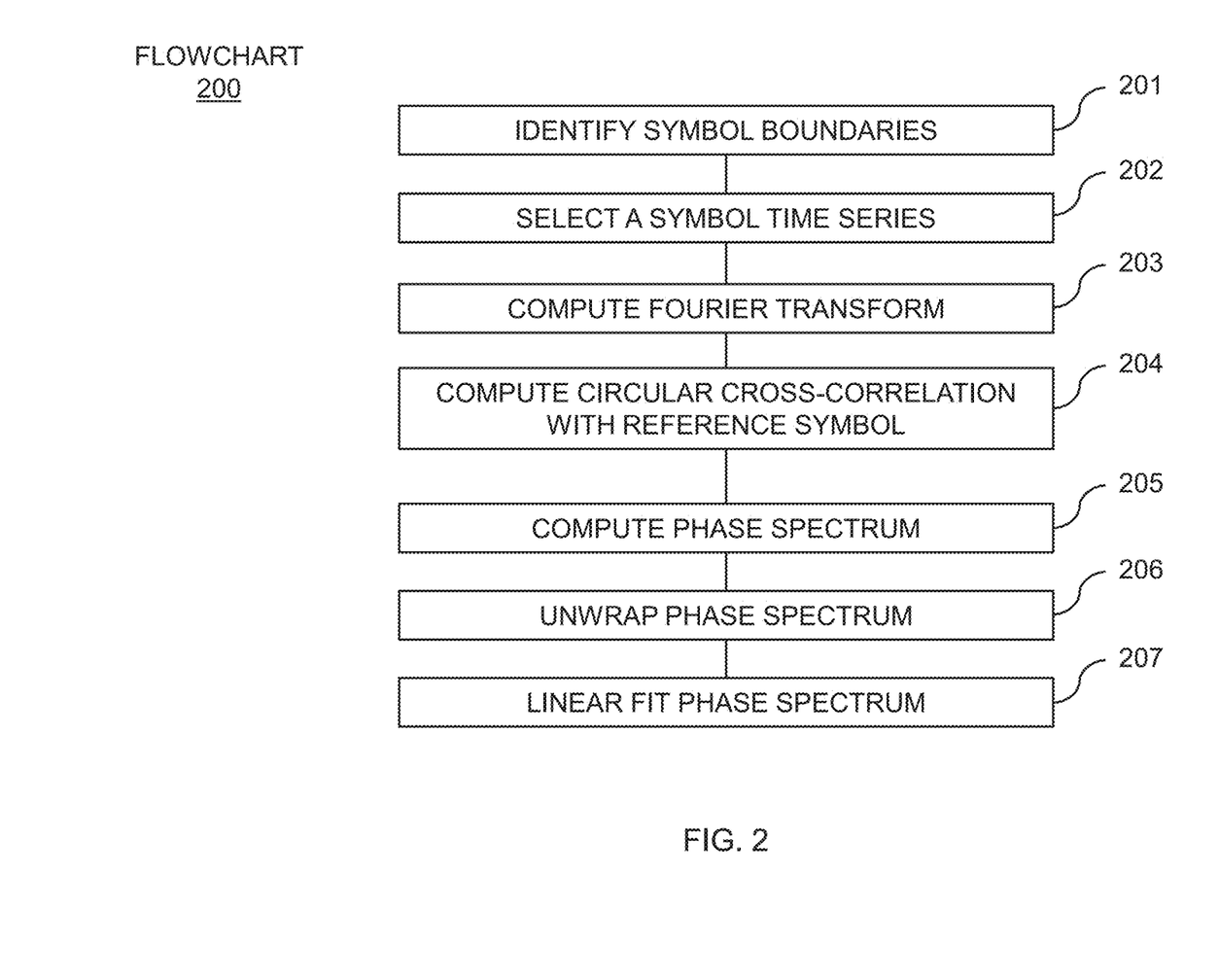
FIG. 2 depicts a flow chart illustrating an exemplary process for signal processing for performing more accurate physical measurements using RF signals by transmitting a spread spectrum waveform according to an embodiment of the subject matter described herein.

FIG. 2 depicts a flow chart 200 illustrating an exemplary process for performing more accurate physical measurements using RF by transmitting a spread spectrum waveform according to an embodiment of the subject matter described herein. It is appreciated that the subject matter herein may refer to several different slopes and intercepts. The focus of the slopes and intercepts discussed above is that phase versus frequency can determine distance. The discussion below addresses something different, namely, analyzing the phase of the zero-frequency element in the Fourier transform (which is the carrier frequency) versus time. The process includes transmitting symbols sequentially, computing a zero-frequency phase for each symbol, and computing the phase versus time slope. This measurement provides relative carrier frequency, which is described in further detail below.

To achieve a more accurate distance measurement, the transmission of both radio device 101 and radio device 102 can be a spread spectrum waveform, such as, for example, a pseudo-random noise sequence modulating digital data using binary phase shift keying (BPSK), quadrature phase shift keying (QPSK), or polyphase codes. The receiving radio (e.g., radio device 102), following the process outlined in FIG. 2, can select a sequence of data for each symbol (steps 201 and 202), compute the Fourier transform of each symbol (step 203), and compute the phase versus frequency spectrum of the symbol (steps 204-207). If the reference waveform is not zero phase or linear phase, the phase versus frequency spectrum of the reference spread spectrum waveform can be subtracted, leaving a residual phase versus frequency spectrum. One method includes cross-correlating the received waveform with the reference waveform (step 204), which can be accomplished by multiplication of the received signal Fourier transform with the Fourier transform of the reference waveform, resulting in a zero phase symbol. The phase versus frequency spectrum can be unwrapped to provide a continuous phase estimate and then linearly fit versus frequency. The computed phase versus frequency slope can be used in Equation [3] to determine the distance between radio device 101 and radio device 102.

In this exemplary configuration, the distance determined by Equation [3] is the relative distance traveled of the arriving waveform compared to the assumed time of the reference waveform. Therefore, if the reference waveform is aligned with the closest baseband clock cycle to the measured waveform, then the measured distance is the fractional part of the distance propagated during one baseband clock cycle. Or, for the 40 MHz baseband clock example discussed above, the measured distance would be a fraction of one clock cycle, or a fraction of 7.5 meters for speed of light propagation, which is called $dx_{102}$.

When radio device 101 transmits and radio device 102 receives, the measurement made at radio device 102 is a pseudo-range, in that the measurement is precise, but ambiguous due to the unknown transmit time on radio device 101. Such a pseudo-range can be a useful measurement whereby measurements from multiple radio devices (e.g., emitters) can be used to resolve timing ambiguities.

According to another aspect, radio device 103 can measure pseudo-ranges from both radio device 101 and radio device 102. In addition, if radio device 101 and radio device 102 are making a round-trip transaction, then radio device 103 can measure the time difference of arrival of the transmission from radio device 101 and from radio device 102.

In order to measure an absolute distance, a round-trip measurement is made where radio device 101 performs linear phase measurements as described above for radio device 102, resulting in a measurement $dx_{101}$. Combining all of these measurements, the time and distance measurements for a round-trip time-of-flight are given, respectively in Equation [10] and [11].

$$TOF_{fine} = \left( \frac{M_{101} + dx_{101}}{f_{101}} - \frac{M_{102} + dx_{102}}{f_{102}} \right) / 2 \quad [10]$$

and $$x_{fine} = c \cdot \left( \frac{M_{101} + dx_{101}}{f_{101}} - \frac{M_{102} + dx_{102}}{f_{102}} \right) / 2 \quad [11]$$

The term $$\frac{\partial N}{\partial f}$$

in Equation [3] reflects integer jumps in the fractional wavelength. Integer jumps occur when the fractional wavelength varies by one cycle (two pi radians) during one measurement, which is a function of possible distance range, L, and the bandwidth, BW, shown in Equation [12].

$$\frac{\partial N}{\partial f} = \text{FLOOR}\left( \frac{L \cdot BW}{c} \right) \quad [12]$$

Where FLOOR indicates rounding down to the next least integer. For the example where the baseband clock sample separation is 7.5 meters, bandwidth is 20 MHz, and the speed, c, is $3 \times 10^8$ meters/sec, $$\frac{\partial N}{\partial f}$$

will always be zero.

For a half-duplex implementation, when the linear fit of the residual phase versus frequency spectrum is computed, the intercept at the nominal carrier frequency is also estimated. If the waveform contains multiple symbols, then these intercepts can be analyzed versus time, unwrapped, and linear fit versus time to compute the intercept versus time estimate, which can be used in Equation [5]. Any particular frequency can be used, though the nominal carrier frequency is convenient because the nominal carrier frequency is the intercept of the linear fit to the residual phase versus frequency spectrum.

The intercept of the intercept versus time linear fit provides an estimate of the fractional wavelength of the carrier frequency at the receiver. Adding these intercept values provides the phase of the round trip measurement.

Alternatively, the intercept of the phase versus frequency slopes of each symbol can be linearly fit versus time to allow speed to be estimated using Equation [6].

It is appreciated that any spread spectrum waveform can be used if the waveform is known to the receiver. If the waveform is known to the receiver, the receiver can determine the expected phase spectrum. The expected phase spectrum can be subtracted from the measured phase spectrum. Alternatively, if the waveform is known to the receiver, the receiver can cross-correlate with the known waveform in order to produce a result that is zero phase.

One spread-spectrum waveform that can be used is a Hermitian waveform, which has the property that its Fourier transform is pure real. By transmitting a Hermitian waveform, any distortion due to carrier frequency differences between transmitting and receiving radios does not alter the measured phase vs. frequency slope or intercept, due to the frequency shifting property of the Fourier transform. An exemplary system can use a Hermitian chirp waveform for each symbol, such as shown in FIG. 3.

Figure 3:
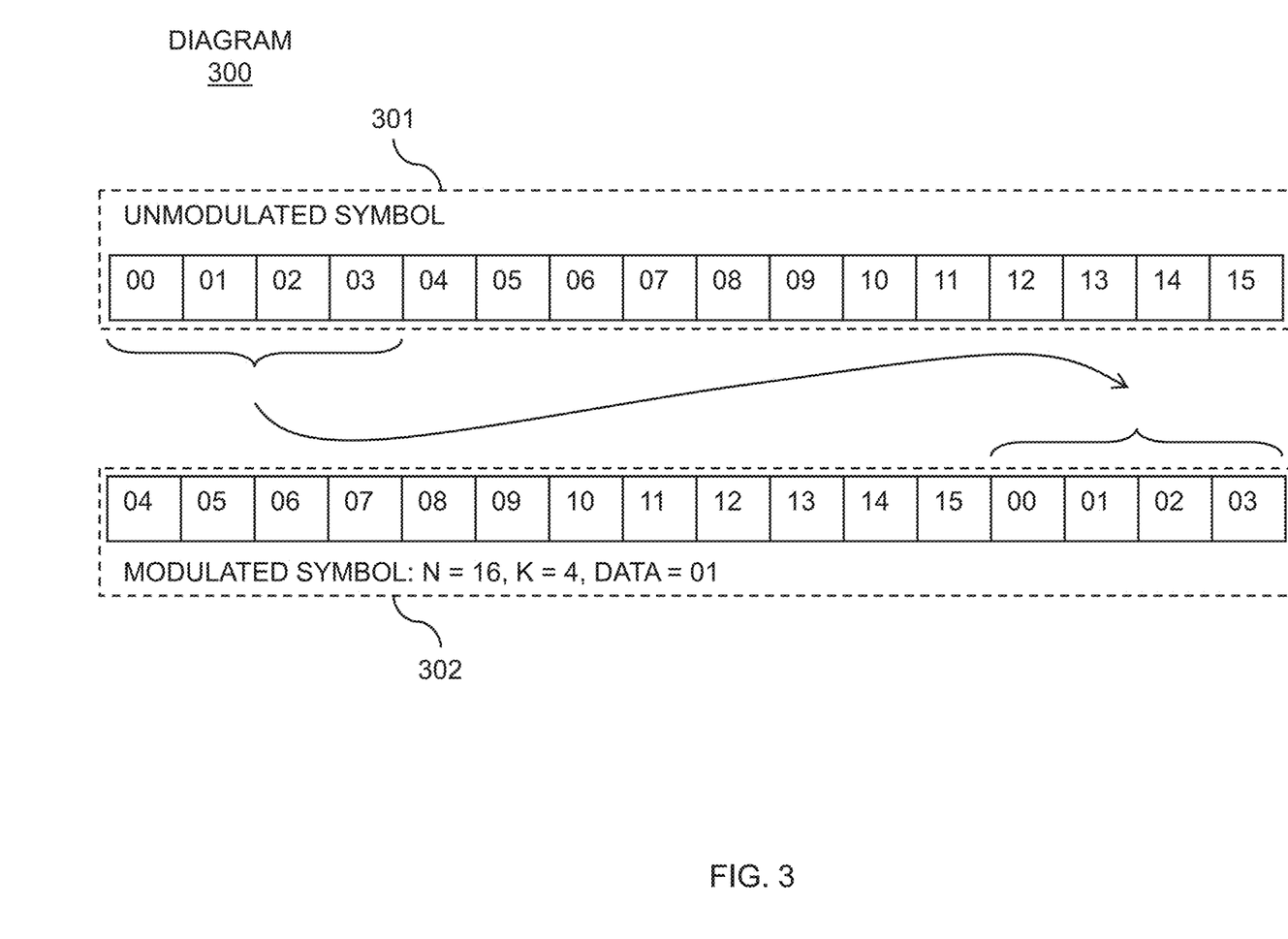
FIG. 3 depicts a diagram illustrating a circular-shift keying (CSK) method of encoding digital data on a Hermitian waveform that can occur concurrently with making physical measurements using RF signals according to an embodiment of the subject matter described herein.

FIG. 3 is a diagram 300 (including unmodulated symbol 301 and modulated symbol 302) illustrating a circular-shift keying (CSK) method of encoding digital data on a Hermitian waveform for performing more accurate physical measurements using RF according to an embodiment of the subject matter described herein.

One method of encoding digital data on the exemplary Hermitian waveform is circular-shift keying (CS K) illustrated in FIG. 3. Using CSK, the transmitted baseband symbol samples are circularly shifted to represent digital data. For a symbol of length N, $\log_2(N/k)$ bits may be transmitted per symbol (bps), where k is the "shift factor" representing the number of digital samples shifted per bit. A circularly shifted waveform z[n] is denoted in Equation [13] as a function of the original waveform x[n] indexed by the modulo-N index $(n-m)_N$ where m=k(data). In FIG. 3, a symbol with length N=16 is modulated to represent the data value 1. Four samples are circularly shifted from the beginning of the waveform to the end of the waveform. Because k=4, bps=2 in the FIG. 3 example.

$$z[n]=x[(n-m)_N], 0 \le n \le N-1 \qquad [13]$$

CSK may scale to larger or smaller symbols or different k values. CSK may also use non-integer values of k or bps, and N is not constrained to a power of 2. CSK may be combined with other modulation techniques such as BPSK, QPSK, or QAM to transmit additional data per symbol.

Figure 4:
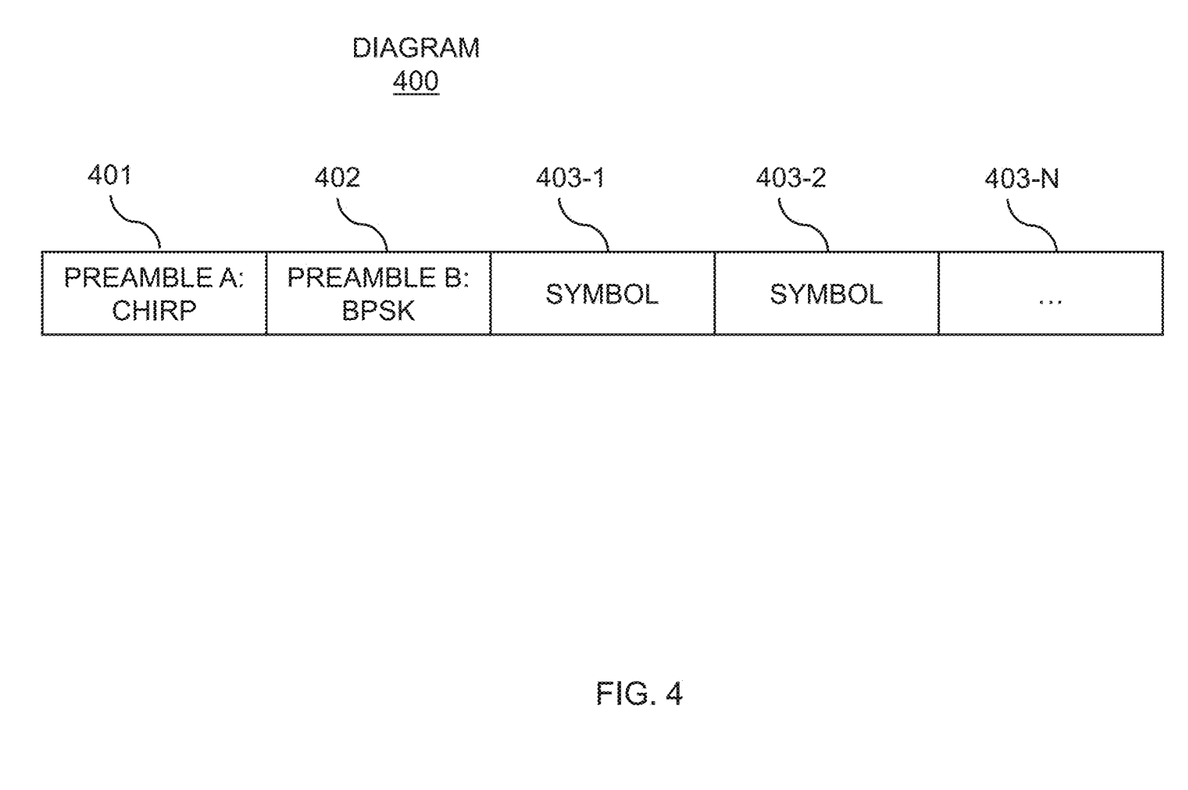
FIG. 4 depicts a diagram illustrating an exemplary waveform packet structure for implementing Hermitian waveforms and CSK for performing physical measurements using RF according to an embodiment of the subject matter described herein.

FIG. 4 depicts a diagram 400 illustrating a packetized burst communication protocol with packet structure for implementing Hermitian waveforms and CSK for performing physical measurements using RF signals according to an embodiment of the subject matter described herein. It is appreciated that a "chirp" may refer to a signal in which the frequency increases (up-chirp) or decreases (down-chirp) with time. Referring to FIG. 4, Preamble a 401 is used to settle the receiver's Automatic Gain Control (AGC) on the incoming waveform. Preamble B 402 is used to detect the Start of Frame Delimiter (SFD) and is used as the reference point for RF signal measurements. Repeated symbols 403-1, 403-2 thru 403-N using the exemplary Hermitian chirp waveform with CSK modulation are used for data transfer and for calculating RF signal measurements on the incoming waveform.

According to one embodiment, preamble A 401 may be a chirp waveform which allows for instantaneous power calculations of the received waveform. Preamble B 402 may use two or more repetitions of a BPSK pseudo-random noise sequence to detect SFD and correct for coarse carrier phase and carrier frequency offset. It is appreciated, however, that other arbitrary waveforms may also be used for AGC lock and SFD detection to determine symbol framing without departing from the scope of the subject matter described herein.

Figure 5:
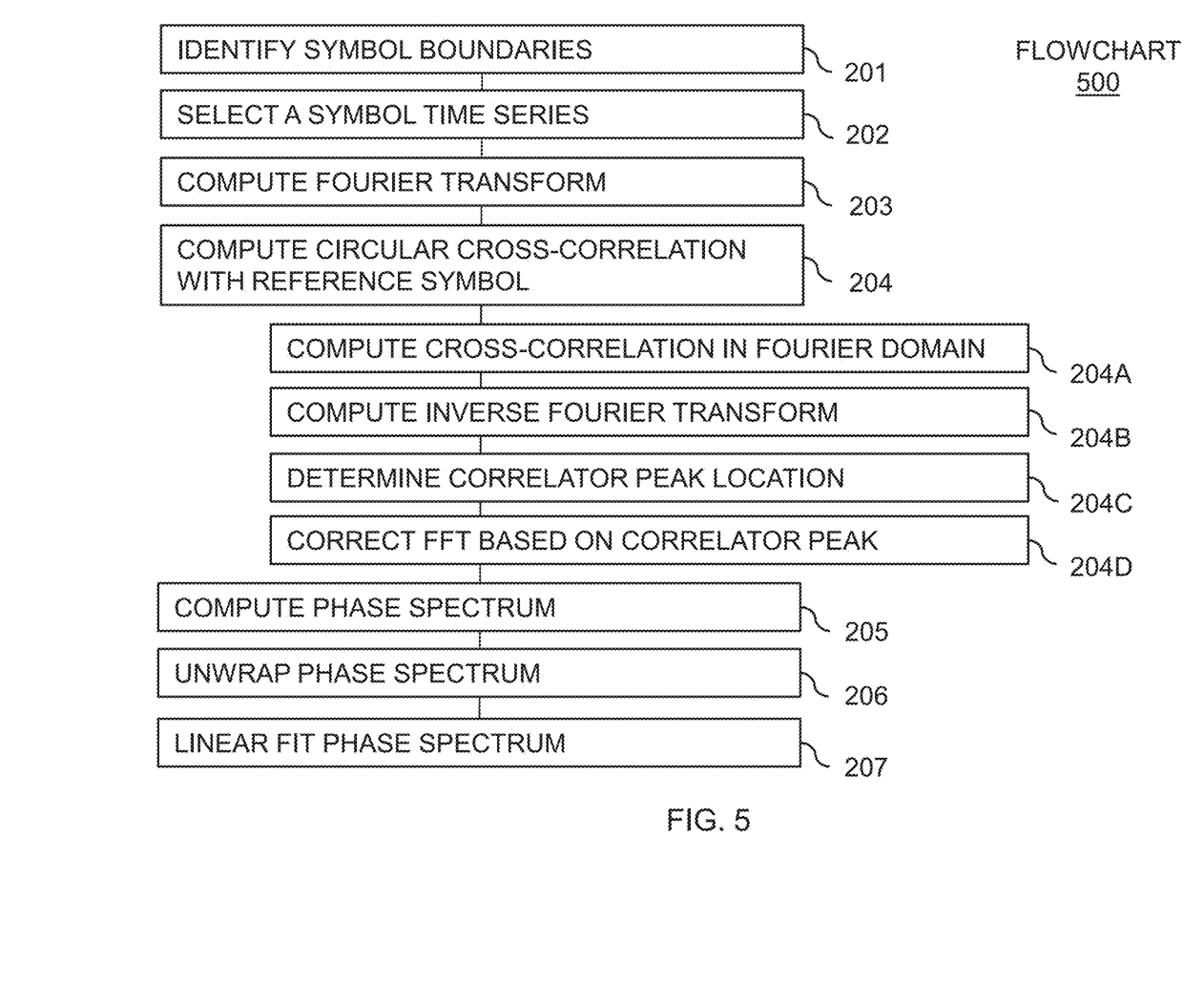
FIG. 5 depicts a flow chart illustrating the exemplary signal processing process of FIG. 2 modified to include fast Fourier transform (FFT) correction for CSK modulation according to an embodiment of the subject matter described herein.

FIG. 5 depicts a flow chart 500 illustrating the exemplary measurement process and Steps 201-207 of FIG. 2 modified to include fast Fourier transform (FFT) correction (Steps 204A-204D) for CSK modulation according to an embodiment of the subject matter described herein. Referring to FIG. 5, steps 204B and 204C demodulate CSK data by taking the inverse FFT (IFFT) of the circular cross-correlation and then determining the peak magnitude of the circular cross-correlation in the time domain. The index of this correlator peak, m, divided by the shift factor, k, equals the CSK data value for each symbol. CSK modulation also impacts the FFT of Step 204 via the circular shift property of the discrete Fourier transform. If the DFT of the original waveform x[n] is represented as X[k], then the circularly shifted spectrum Z[k] is represented according to Equation [14].

$$Z[k] = DFT\{x[(n-m)_N]\} = e^{-2\pi m \frac{k}{N}} X[k] \qquad [14]$$

The correlator peak value m is used in Step 204d to correct the FFT by rotating each complex sample in the FFT domain by the corresponding factor $$e^{2\pi m \frac{k}{N}}$$

to reverse the impact of Equation [14]. This may be efficiently implemented in hardware as a point-by-point complex multiplication with a unit vector or by a COordinate Rotation DIgital Computer (CORDIC) based rotation. Alternatively, CSK impact may also be reversed by rearranging the time-domain samples of $x[<n-m>_N]$ based on the correlator peak value m and then subsequently performing an additional FFT operation. After Step 204d, the remainder of the Steps 205-207 may be performed on the corrected FFT spectrum.

The methods disclosed herein may be implemented on purpose-built devices such as a custom built device with assembled hardware or the like. Additionally, the methods and systems disclosed herein could be implemented on existing RF communications devices that utilize communication modules embodying Wi-Fi®, Bluetooth®, Bluetooth® Low Energy, cellular long term evolution (LTE®), or many other communications systems and devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby®, JavaScript®, Java®, Python®, PHP, C, C++, C#, Objective-C®, Go®, Scala®, Swift®, Kotlin®, OCaml®, or the like. The program code may execute entirely on the user's computer, partly on the user's computer, as a stand-alone software package, partly on the user's computer, and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented on a first radio device, the method comprising:
    receiving a radio frequency (RF) signal from a second radio device;

transforming a spread-spectrum waveform of the RF signal into a frequency domain to generate a transformed frequency domain spread-spectrum waveform;

determining a frequency of the RF signal;

determining a slope of a phase versus the frequency corresponding to a rate of change of the phase with the frequency based on the transformed frequency domain spread-spectrum waveform; and determining a time-of-flight between the first radio device and the second radio device based on the slope, wherein the time-of-flight is proportional to the slope plus an integer ambiguity term.

2. The method of claim 1, wherein the RF signal includes a carrier frequency and the frequency of the RF signal is the carrier frequency of the RF signal.

3. The method of claim 2, further comprising measuring a relative carrier frequency.

4. The method of claim 1, wherein determining the slope includes receiving individual frequency elements and determining the slope over at least one of sequential measurements and overlapping measurements.

5. The method of claim 1, further comprising:
determining segments of frequency elements using multiple spread-spectrum transmissions having separated carrier frequencies; and
determining a wide-band phase-to-frequency relationship from the multiple spread-spectrum transmissions.

6. The method of claim 1, further comprising:
determining a plurality of wide-band phases from zero-frequency intercepts of multiple spread-spectrum transmissions having separated carrier frequencies; and
determining a wide-band phase-to-frequency relationship from the plurality of wide-band phases.

7. The method of claim 1, further comprising determining a current time of day relative to the first radio device based on an encoded current time of day relative to the second radio device and the time-of-flight, wherein the RF signal includes the encoded current time of day relative to the second radio device.

8. The method of claim 1, further comprising determining a zero-frequency intercept of the slope relative to the phase of the RF signal and the frequency of the RF signal.

9. The method of claim 1, wherein the time-of-flight represents a physical distance between the first radio device and the second radio device.

10. The method of claim 1, wherein the RF signal comprises a spread-spectrum Hermitian waveform and the spread-spectrum Hermitian waveform includes a Hermitian chirp waveform, and further comprising using circular-shift keying (CSK) data modulation on the Hermitian chirp waveform that includes circularly shifting transmitted baseband symbol samples to represent digital data.

11. A first radio device comprising:
a radio receiver configured for receiving a radio frequency (RF) signal from a second radio device; and
measurement circuitry electrically coupled with the radio receiver, the measurement circuitry configured for:

transforming a spread-spectrum waveform of the RF signal into a frequency domain to generate a transformed frequency domain spread-spectrum waveform;

determining a frequency of the RF signal;

determining a slope of a phase versus the frequency corresponding to a rate of change of the phase with the frequency based on the transformed frequency domain spread-spectrum waveform; and determining a time-of-flight between the first radio device and the second radio device based on the slope, wherein the time-of-flight is proportional to the slope plus an integer ambiguity term.

12. The first radio device of claim 11, wherein the RF signal includes a carrier frequency and the frequency of the RF signal is the carrier frequency of the RF signal.

13. The first radio device of claim 12, wherein the measurement circuitry is further configured for measuring relative carrier frequency.

14. The first radio device of claim 11, wherein the measurement circuitry is further configured for determining a zero-frequency intercept of the slope relative to the phase of the RF signal and the frequency of the RF signal.

15. The first radio device of claim 11, wherein determining the slope of the phase versus the frequency includes receiving individual frequency elements and determining the slope of the phase versus the frequency over at least one of sequential measurements and overlapping measurements.

16. The first radio device of claim 11, wherein the measurement circuitry is further configured for:
determining segments of frequency elements using multiple spread-spectrum transmissions having separated carrier frequencies; and
determining a wide-band phase-to-frequency relationship from the multiple spread-spectrum transmissions.

17. The first radio device of claim 11, wherein:
the RF signal comprises an encoded current time of day relative to the second radio device; and
the measurement circuitry is further configured for determining a current time of day relative to the first radio device based on the encoded current time of day relative to the second radio device and the time-of-flight.

18. The first radio device of claim 11, wherein the measurement circuitry is further configured for determining a phase and a frequency of the RF signal and determining a zero-frequency intercept of the phase versus frequency slope.

19. The first radio device of claim 11, wherein the time-of-flight represents a physical distance between the first radio device and the second radio device.

20. The first radio device of claim 11, wherein the RF signal comprises a spread-spectrum Hermitian waveform and the spread-spectrum Hermitian waveform includes a Hermitian chirp waveform, and further comprising using circular-shift keying (CSK) data modulation on the Hermitian chirp waveform that includes circularly shifting transmitted baseband symbol samples to represent digital data.

* * * * *